US012437097B2

(12) United States Patent
Zinger et al.

(10) Patent No.: US 12,437,097 B2
(45) Date of Patent: Oct. 7, 2025

(54) ACCESS CONTROL COMMAND PROCESSING IN A DISTRIBUTED DATA STORAGE SYSTEM

(71) Applicant: Dell Products L.P., Round Rock, TX (US)

(72) Inventors: Eldad Zinger, Raanana (IL); Amit Engel, Tel Aviv (IL); Elad Grupi, Pardes Hana (IL)

(73) Assignee: Dell Products L.P., Round Rock, TX (US)

( * ) Notice: Subject to any disclaimer, the term of this patent is extended or adjusted under 35 U.S.C. 154(b) by 137 days.

(21) Appl. No.: 18/399,997

(22) Filed: Dec. 29, 2023

(65) Prior Publication Data
US 2025/0217503 A1 Jul. 3, 2025

(51) Int. Cl.
*G06F 21/62* (2013.01)

(52) U.S. Cl.
CPC ................................. *G06F 21/6218* (2013.01)

(58) Field of Classification Search
CPC .................................................... G06F 21/6218
See application file for complete search history.

(56) References Cited

U.S. PATENT DOCUMENTS

| | | | | |
|---|---|---|---|---|
| 7,293,154 B1 * | 11/2007 | Karr | ..................... | G06F 11/2082 711/202 |
| 7,331,058 B1 * | 2/2008 | Gladney | ............. | G06F 21/6218 726/2 |
| 7,433,998 B2 * | 10/2008 | Dawkins | ............... | G06F 3/0689 711/202 |
| 8,732,354 B1 * | 5/2014 | Salli | ....................... | G06F 3/0635 710/36 |
| 9,240,985 B1 * | 1/2016 | Potakamuri | ............ | H04L 63/08 |
| 10,558,376 B2 | 2/2020 | Hahn et al. | | |
| 10,585,830 B2 * | 3/2020 | Sajeepa | ................... | G06F 13/24 |
| 11,632,360 B1 | 4/2023 | Tan et al. | | |
| 11,822,511 B2 | 11/2023 | Kamath | | |
| 11,822,801 B2 | 11/2023 | Tylik et al. | | |
| 12,216,592 B1 * | 2/2025 | Pinhas | ................... | G06F 3/0665 |
| 12,271,638 B1 * | 4/2025 | Pinhas | ................... | G06F 3/0659 |
| 2009/0274165 A1 * | 11/2009 | Csaszar | ................... | H04L 47/72 370/443 |

(Continued)

*Primary Examiner* — Gary S Gracia
(74) *Attorney, Agent, or Firm* — BainwoodHuang

(57) ABSTRACT

Access control data stored in the storage servers of a distributed data storage system is modified according to received access control commands and accessed to process host I/O requests without requiring the use of locks. Processing of certain access control commands includes allocating a new volume descriptor to store the updated access control data for a corresponding storage volume, and remapping the storage volume to the new volume descriptor with a single write operation. Each volume descriptor stores both reservation type and reservation holder data for the corresponding storage volume within a single memory register, allowing host I/O request processing logic to read both reservation type and reservation holder using a single read operation, and access control command processing logic to modify both reservation type and reservation holder using a single write operation. A registrants bitmap in the volume descriptor represents hosts registered for the corresponding storage volume.

15 Claims, 13 Drawing Sheets

---

LOOKUP THE VOLUME DESCRIPTOR FOR THE TARGET STORAGE VOLUME IN LOCAL ACCESS CONTROL DATA STRUCTURE 1002

↓

PERFORM A SINGLE WRITE OPERATION TO THE RESERVATION HOLDER AND RESERVATION TYPE MEMORY REGISTER IN THE VOLUME DESCRIPTOR FOR THE TARGET STORAGE VOLUME THAT SETS THE RESERVATION TYPE TO THE REQUESTED TYPE AND ALSO SETS THE RESERVATION HOLDER TO THE HOST INDEX OF THE REQUESTING HOST 1004

(56) References Cited

U.S. PATENT DOCUMENTS

| | | | | |
|---|---|---|---|---|
| 2011/0225362 | A1* | 9/2011 | Leggette | G06F 3/0638 |
| | | | | 711/114 |
| 2011/0258461 | A1* | 10/2011 | Bates | G06F 11/1464 |
| | | | | 711/135 |
| 2014/0041053 | A1* | 2/2014 | Edwards | G06F 21/80 |
| | | | | 726/28 |
| 2014/0258239 | A1* | 9/2014 | Amlekar | G06F 11/1402 |
| | | | | 707/649 |
| 2016/0154834 | A1* | 6/2016 | Friedman | G06F 3/067 |
| | | | | 707/657 |
| 2016/0366226 | A1* | 12/2016 | Friedman | G06F 3/0608 |
| 2020/0401316 | A1* | 12/2020 | Hankins | G06F 12/0868 |
| 2021/0320975 | A1* | 10/2021 | McCarthy | H04L 49/9078 |
| 2022/0334775 | A1* | 10/2022 | Stotski | G06F 3/0644 |
| 2023/0004575 | A1* | 1/2023 | Harduf | G06F 16/2343 |
| 2024/0176513 | A1* | 5/2024 | Bradley | G06F 3/067 |
| 2024/0248758 | A1* | 7/2024 | Nambi | G06F 9/5016 |
| 2024/0361936 | A1* | 10/2024 | Kaufman | G06F 3/0641 |
| 2025/0217503 | A1* | 7/2025 | Zinger | G06F 21/6218 |

* cited by examiner

ACCESS CONTROL COMMAND PROCESSING IN A DISTRIBUTED DATA STORAGE SYSTEM

TECHNICAL FIELD

The present disclosure relates generally to controlling host access to storage volumes by a distributed data storage system.

BACKGROUND

Data storage systems are arrangements of hardware and software that are coupled to non-volatile data storage drives, such as solid state drives and/or magnetic disk drives. The data storage system services host I/O requests received from physical and/or virtual host machines ("hosts"). The host I/O requests received by the data storage system specify host data that is written and/or read by the hosts. The data storage system executes software that processes the host I/O requests by performing various data processing tasks to efficiently organize and persistently store the host data in the non-volatile data storage drives of the data storage system.

In a distributed data storage system, volumes of non-volatile data storage ("storage volumes") are exposed to and accessed by one or more hosts through multiple data storage servers. Host access to the storage volumes may be controlled in the distributed data storage system, by maintaining reservation and registration state for each storage volume. This state data for a storage volume may include indications such as i) whether and how the storage volume is currently reserved, ii) the identity of a host that currently holds the reservation for the storage volume, and/or iii) a list of hosts that are currently registered for the storage volume. Hosts may issue access control commands to the distributed data storage system to modify the reservation and registration state of individual storage volumes.

SUMMARY

In the disclosed technology, access control data is stored in each storage server of a distributed data storage system. The access control data stored in each storage server includes i) multiple volume descriptors, each one of which stores access control data for a respective one of multiple storage volumes that are served by the distributed data storage system to a number of hosts, and ii) an index array that maps the individual storage volumes to respective ones of the volume descriptors. In response to a preempt reservation access control command being received by the distributed data storage system, the disclosed technology performs steps in each one of the storage servers to update the access control data stored therein according to indications contained in the command, including i) allocating a new volume descriptor, ii) setting reservation type, reservation holder, and registered hosts data in the new volume descriptor according to indications contained in the received preempt reservation command, and iii) performing a single write operation on the index array that updates the index array to map the target storage volume indicated in the received preempt reservation command to the new volume descriptor.

In some embodiments of the disclosed technology, each volume descriptor stores both reservation type and reservation holder data for the respective one of the storage volumes within a single memory register.

In some embodiments, the disclosed technology performs access control on each host I/O (Input/Output) command received by the distributed data storage system at least in part by i) using the index array to translate a volume identifier of a target storage volume indicated by the host I/O command into a memory location of the volume descriptor for that target storage volume, ii) reading both reservation type and reservation holder data for the target storage volume together from the volume descriptor for the target storage volume only once, using a single read operation, and iii) processing the host I/O command if such processing is permitted by the reservation type and reservation holder data.

In some embodiments, in response to an unregister access control command being received by the distributed data storage system, the disclosed technology updates the access control data stored in each one of the storage servers by performing steps in each one of the storage servers that include: i) using the index array to translate a volume identifier of the target storage volume indicated by the command into a memory location of the volume descriptor for the target storage volume, ii) in response to determining from the volume descriptor for the target storage volume that the host that issued the unregister command currently holds the reservation for the target storage volume, setting the reservation type for the target storage volume to indicate that the target storage volume is not reserved, iii) synchronizing execution with all other execution threads in the storage server; and then iv) clearing a bit corresponding to the host that issued the unregister command in a registrants bitmap located within the volume descriptor for the target storage volume.

In some embodiments, in response to an acquire reservation access control command being received by the distributed data storage system, the disclosed technology updates the access control data stored in each one of the storage servers by performing steps in each one of the storage servers that include i) translating a volume identifier of a target storage volume indicated by the command into a memory location of the volume descriptor for the target storage volume using the index array, and ii) performing a single write operation to the volume descriptor for the target storage volume that sets the reservation type to a reservation type indicated by the acquire reservation command and the reservation holder information to indicate the host that issued the acquire reservation command.

The disclosed technology is integral to providing a practical technical solution to the problem of processing host access control commands and host I/O requests in a distributed data storage system that has a non-preemptive execution environment. The disclosed technology ensures operational correctness, while providing high performance for both the access control commands and the host I/O requests. The disclosed technology avoids high levels of contention while allowing concurrent execution of host I/O request processing threads that may each read the same access control data and threads that process access control data commands. Without the disclosed technology, for each host I/O request received, host I/O request processing logic may be required to acquire a lock (e.g. a read lock) before it can access the relevant reservation and/or registration data within the access control data. Contention for such a lock under high load conditions often results in reduced performance for host I/O command processing. In addition, without the disclosed technology, processing of access control commands may require acquisition of a lock before the access control data can be modified, which negatively impacts performance during processing of those commands. Without the disclosed technology, host I/O request processing threads that process host I/O requests directed to multiple storage volumes may have to wait to access control data for one storage volume while access control command processing logic modifies the access control data of another, different storage volume. Moreover, the alternative in systems without the disclosed technology of providing separate host I/O request processing threads for individual storage volumes is generally impractical, especially where very large numbers of storage volumes are served by the distributed data storage system.

Advantageously, the disclosed technology may be embodied without the requirement of locks or other generic synchronization mechanisms, while still providing correctness of operation, thus allowing high levels of host I/O request and access control command processing execution concurrency within the individual storage servers of the distributed data storage system.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Figure 1:
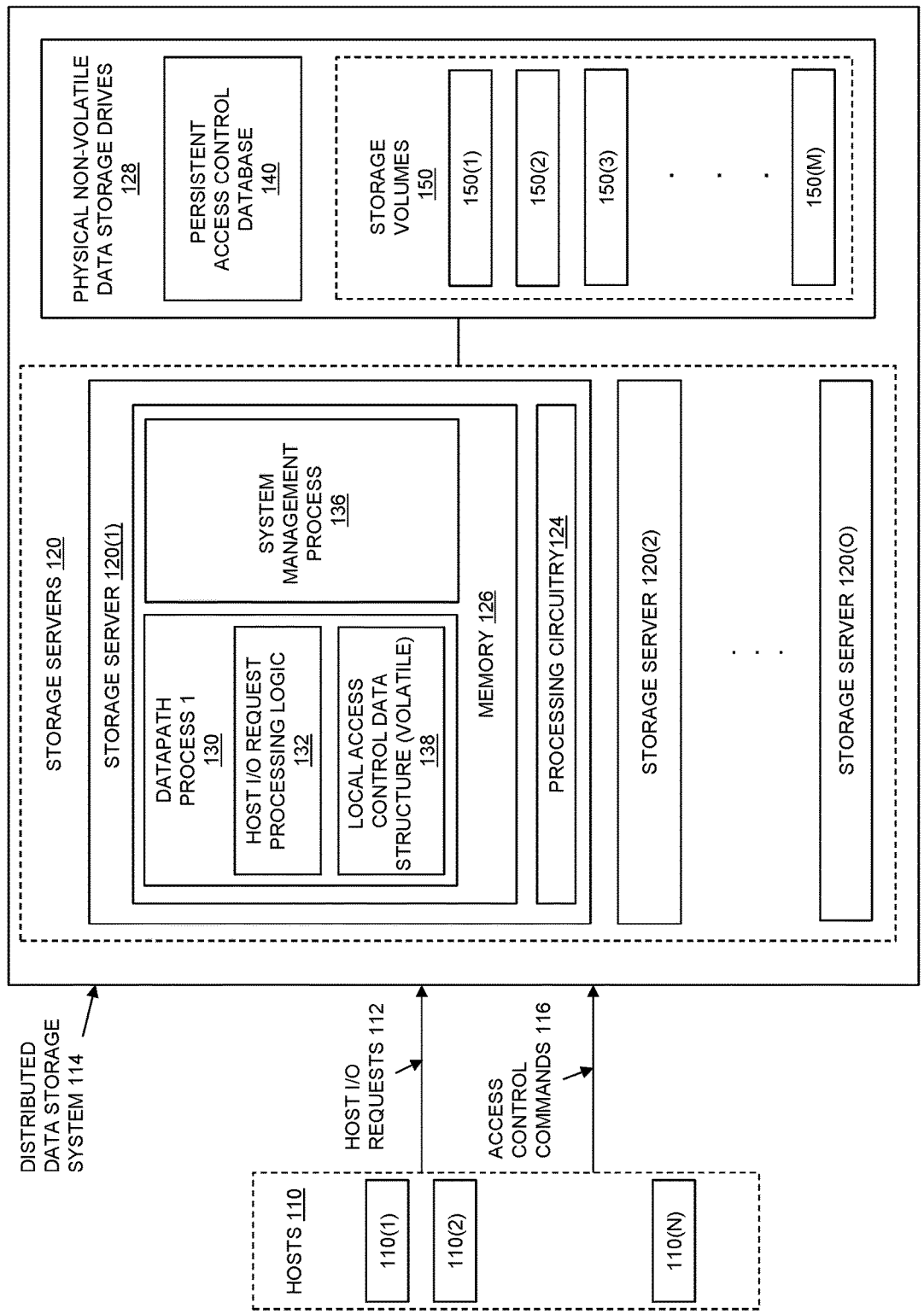
FIG. 1 is a block diagram showing an example of a distributed data storage system including an illustrative embodiment of the disclosed technology.

Embodiments will now be described with reference to the figures. The embodiments described herein are not limiting, and are provided only as examples, in order to illustrate various features and principles of the disclosed technology. The embodiments of the disclosed technology described herein are integrated into a practical solution to the technical problem of processing host access control commands and host I/O requests in a distributed data storage system with operational correctness, while also providing high performance for both the access control commands and the host I/O requests.

The disclosed technology stores access control data in each storage server of a distributed data storage system. The stored access control data is the same in each storage server, and may include i) multiple volume descriptors, each one of which stores access control data for a respective one of multiple storage volumes that are served by the distributed data storage system to a number of hosts, and ii) an index array that maps the individual storage volumes to respective ones of the volume descriptors. The disclosed technology responds to a preempt reservation command received by the distributed data storage system by performing steps in each one of the storage servers to update the access control data stored therein according to indications contained in the preempt reservation command. These steps include i) allocating a new volume descriptor, ii) setting reservation type, reservation holder, and registered hosts data in the new volume descriptor according to the indications in the received preempt reservation command, and iii) performing a single write operation on the index array that updates the index array to map the target storage volume indicated in the received preempt reservation command to the new volume descriptor.

Each volume descriptor may store both reservation type and reservation holder data for the respective storage volume within a single memory register that can be written or read using a single operation, which is atomic. The disclosed technology may perform access control on each host I/O (Input/Output) command that is received by the distributed data storage system by i) using the index array to translate a volume identifier of a target storage volume indicated by the host I/O command into a memory location of the volume descriptor for that target storage volume, ii) reading both reservation type and reservation holder data for the target storage volume together from the single memory register in the volume descriptor for the target storage volume only once, using a single read operation, and iii) processing the host I/O command if such processing is permitted by the reservation type and reservation holder data.

In response to an unregister command being received by the distributed data storage system, the disclosed technology updates the access control data stored in each one of the storage servers by performing steps in each one of the storage servers that may include: i) using the index array to translate a volume identifier of the target storage volume indicated by the unregister command into a memory location of the volume descriptor for the target storage volume, ii) in response to determining from the volume descriptor for the target storage volume that the host that issued the unregister command currently holds the reservation for the target storage volume, setting the reservation type for the target storage volume to indicate that the target storage volume is not reserved, iii) synchronizing execution with all other execution threads in the storage server; and iv) clearing a bit corresponding to the host that issued the unregister command in a registrants bitmap that is located within the volume descriptor for the target storage volume.

In response to an acquire reservation command being received by the distributed data storage system, the disclosed technology updates the access control data stored in each one of the storage servers according to the contents of the acquire reservation command by performing steps in each one of the storage servers that include i) translating a volume identifier of a target storage volume indicated by the acquire reservation command into a memory location of the volume descriptor for the target storage volume using the index array, and ii) performing a single write operation to the volume descriptor for the target storage volume that sets the reservation type to a reservation type indicated by the acquire reservation command and the reservation holder information to indicate the host that issued the acquire reservation command.

FIG. 1 is a block diagram showing an operational environment for the disclosed technology, including an example of a distributed data storage system in which the disclosed technology is embodied. FIG. 1 shows a number of physical and/or virtual Host Computing Devices 110, referred to as "hosts", and shown for purposes of illustration by Hosts 110(1) through 110(N). The hosts and/or applications executing thereon access storage volumes of non-volatile data storage that are provided by Distributed Data Storage System 114, for example over one or more networks, such as a local area network (LAN), and/or a wide area network (WAN) such as the Internet, etc. Alternatively, or in addition, one or more of Hosts 110 and/or applications accessing storage volumes provided by Distributed Data Storage System 114 may execute within Data Storage System 116.

Distributed Data Storage System 114 includes multiple storage servers, shown by Storage Server 120(1), Storage Server 120(2), and so on through Storage Server(O) within Storage Servers 120. Storage Servers 120 are communicably coupled to both Hosts 110 and Physical Non-Volatile Data Storage Drives 128, e.g. at least in part though one or more communication interfaces. No particular hardware configuration is required, and each one of the storage servers in Storage Servers 120 may be embodied as any specific type of device that is capable of processing host input/output (I/O) requests (e.g. I/O read requests and I/O write requests, etc.), processing access control commands, performing access control, and persistently storing host data.

The Physical Non-Volatile Data Storage Drives 128 may include physical data storage drives such as solid state drives, magnetic disk drives, hybrid drives, optical drives, and/or other specific types of drives.

The components of each individual storage server in Storage Servers 120 include a memory, processing circuitry, and software components that are stored in the memory and executed by the processing circuitry. An illustrative example of components that are similarly contained in each individual one of the storage servers Storage Server 120(1) through Storage Server 120(0) is shown by the components in Storage Server 120(1). As shown in FIG. 1, Storage Server 120(1) includes a Memory 126 that stores program code executed by Processing Circuitry 124, and data generated and/or used by such program code. Each storage processor may also contain some or all of the same software components as are shown in the Memory 126 of Storage Server 120(1), e.g. a data path process such as Datapath Process 1 130, and a System Management Process 136. The Memory 126 may include volatile memory (e.g. RAM), and/or other types of memory. Processing Circuitry 124 includes or consists of multiple processor cores, e.g. within one or more multi-core processor packages. Each processor core includes or consists of a separate processing unit, sometimes referred to as a Central Processing Unit (CPU), that independently executes instructions, e.g. instructions within program logic scheduled for execution as threads of execution on that processor core by a scheduler (not shown).

The processing circuitry and memory of each storage server is configured and arranged to carry out various methods and function described herein. For example, the Processing Circuitry 124 and Memory 126 in Storage Server 120(1) together form control circuitry that is configured and arranged to carry out various methods and functions described herein with regard to Storage Server 120(1). Specifically, the Memory 126 stores a variety of software components that may be provided in the form of executable program code, including Datapath Process 1 130, and System Management Process 136. When the program code stored in Memory 126 is executed by Processing Circuitry 124, Processing Circuitry 124 is caused to carry out the operations of the software components described herein. System Management Process 136 may execute within the scope or context of Datapath Process 1 130. Although certain software components are shown in the Figures and described herein for purposes of illustration and explanation, those skilled in the art will recognize that Memory 126 may also include various other specific types of software components.

During operation of the illustrative embodiment shown in FIG. 1, when a host I/O (Input/Output) request (e.g. one of Host I/O Requests 112) is received by one of the storage servers in the Distributed Data Storage System 114, the data path process executing in that storage server processes the host I/O request. Each individual storage server stores a volatile, local copy of the access control data defined for Distributed Storage System 114, and that local is used by the data path process in that storage server to perform per-storage volume access control on each host I/O request that is received and processed by that storage server. For example, when a host I/O request is received by Storage Server 120(1), Datapath Process 1 130 performs access control using the access control data stored in Local Access Control Data Structure 138. In this case, if Datapath Process 1 130 determines from Local Access Data Structure 138 that the host I/O request is permitted, Host I/O Request Processing Logic 132 is allowed to process the host I/O request. Such processing of permitted host I/O requests may, for example, include processing of block-based host I/O requests received by Storage Server 120(1). The permitted processing may include processing of received host I/O write requests that is completed before an acknowledgement is returned to the host that issued the host I/O request indicating that the host data indicated by the I/O write request has been securely stored by Distributed Data Storage System 114, e.g. either into a cache and/or into one of the storage volumes 150(1) through 150(M) in the Storage Volumes 150 in Physical Non-Volatile Data Storage Drives 128. In the case of host I/O read requests that are received by Storage Server 120(1) and determined to be permitted by Datapath Process 1 130 based on Local Access Control Data Structure 138, the processing by Host I/O Request Processing Logic 132 may include reading the requested host data from a cache or one of the storage volumes in Storage Volumes 150, followed by transmitting the requested host data to the host that issued the host I/O read request.

Access Control Commands 116 received by Distributed Data Storage System 114 from Hosts 110 may include or consist of commands that modify host reservation and registration access control data for individual ones of the storage volumes in Storage Volumes 150. One example of the access control commands processed by Distributed Data Storage System 114 is found in the commands defined by the NVM Command Set Specification of the NVM Express (NVMe) logical-device interface specification. The steps performed by Distributed Data Storage System 114 to process each one of the Access Control Commands 116 are shown in FIG. 2.

Figure 2:
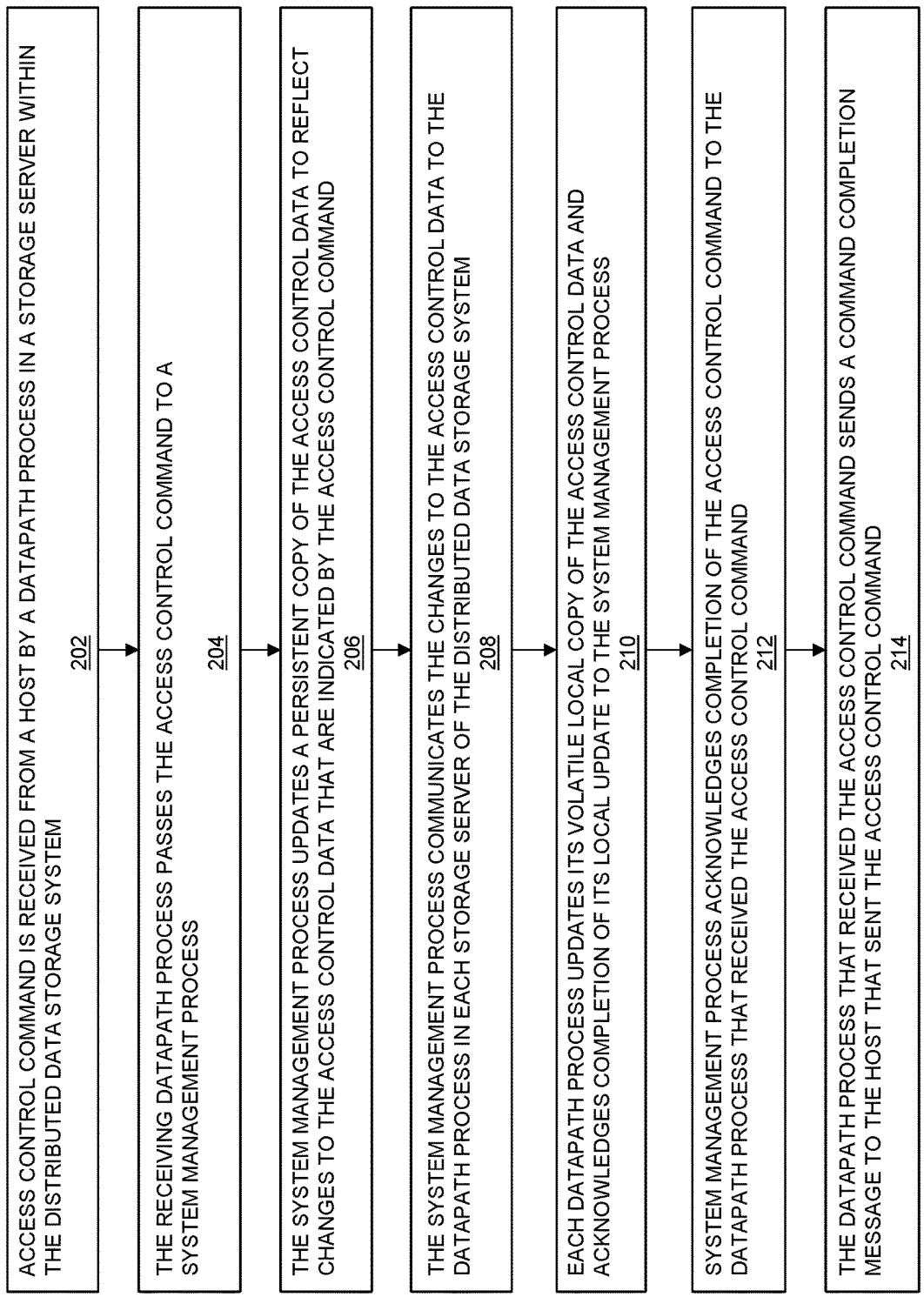
FIG. 2 is a flow chart showing an example of steps performed during operation of some embodiments of the disclosed technology.

As shown in FIG. 2, at step 202, an access control command is received from a host by a data path process of a storage server. For example, the access control command is received by Datapath Process 1 130 in Storage Server 120(1).

At step 204, the receiving data path process passes the access control command to a system management process for the whole Distributed Storage System 114. For example, Datapath Process 1 130 passes the received access control command to System Management Process 136.

At step 206, the system management process updates a persistent copy of the access control data for Distributed Data Storage System 114 to reflect changes to the access control data indicated by the received access control command. For example, System Management Process 136 updates Persistent Access Control Database 140 to reflect the changes to the access control data that are indicated by the received access control command.

At step 208, the system management process communicates the changes to the access control data indicated by the received access control command to the data path process in each one of the storage servers in Distributed Data Storage System 114. For example, System Management Process 136 transmits or otherwise exposes the changes to the access control data that are indicated by the received access control command, or the access control command itself, or the updated access control data stored in Persistent Access Control Database 140 in response to the access control command, to the data path processes located in each individual one of the Storage Servers 120, including Datapath Process 1 130 in Storage Server 120(1).

At step 210, the data path process in each one of the Storage Servers 120 updates its volatile local copy of the access control data according to the changes to the access control data indicated by the received access control command. The data path process then acknowledges completion of the local update to the system management process. For example, Datapath Process 1 130 updates Local Access Control Data Structure 138 according the changes to the access control data indicated by the received access control command, and acknowledges completion of the local update to System Management Process 136.

At step 212, in response to having received acknowledgement from the data path process in each one of the storage servers in Distributed Data Storage System 114 that the update has been completed on their local access control data, the system management process for Distributed Data Storage System 114 acknowledges completion of the received access control command to the data path process that received the access control command. For example, System Management Process 136 acknowledges completion of the received access control command to Datapath Process 1 130.

At step 214, the data path process that received the access control command responds to the acknowledgement of completion of the access control command from the system management process by sending a completion message to the host that sent the access control command. For example, Datapath Process 1 130 sends a completion message to the host in Hosts 110 that sent the access control command received at step 202.

Figure 3:
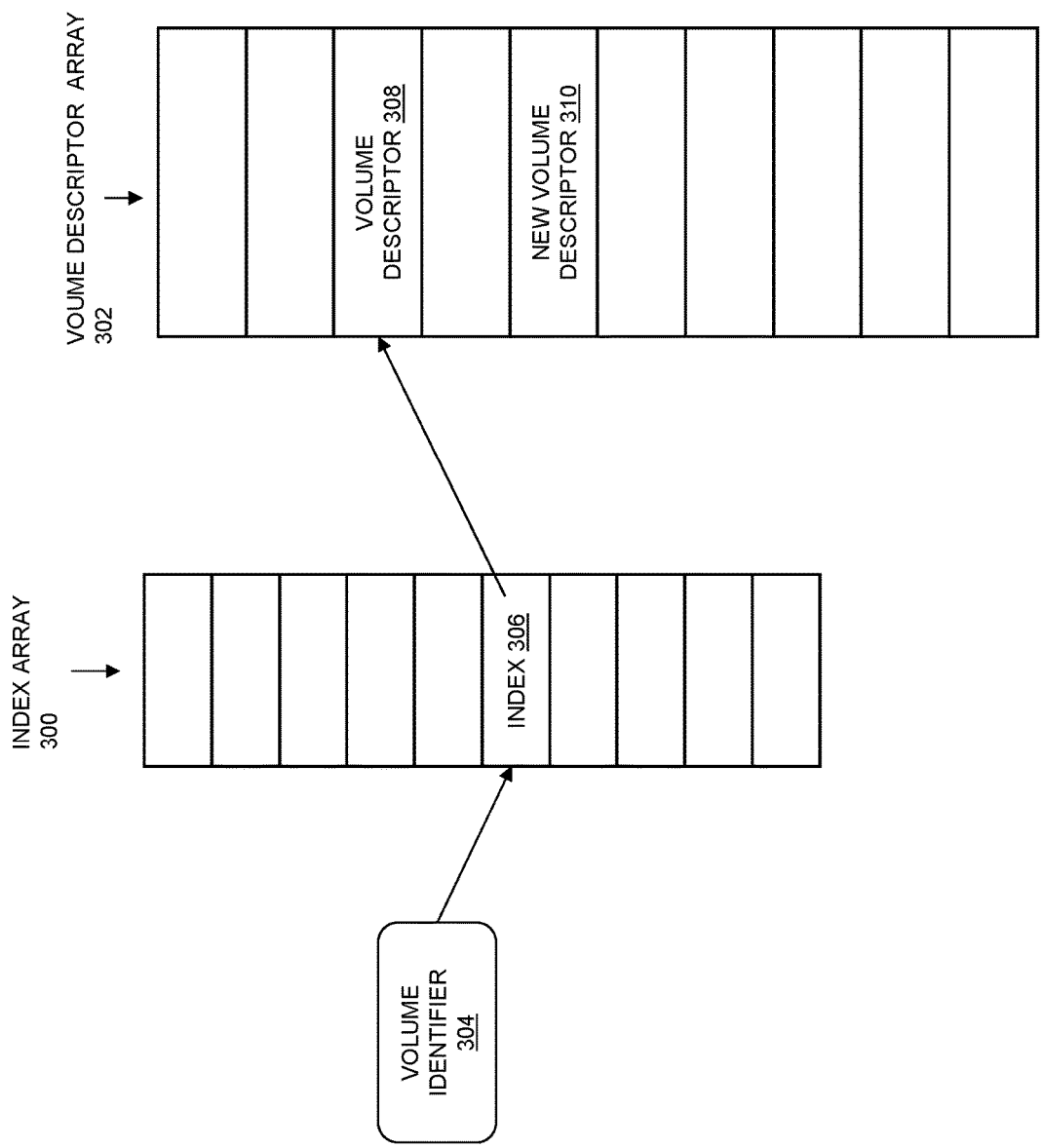
FIG. 3 is a block diagram showing an example of components that map storage volumes to volume descriptors in some embodiments of the disclosed technology.

FIG. 3 is a block diagram showing an example of access control data components that map storage volumes to corresponding volume descriptors in some embodiments of the disclosed technology. The components of FIG. 3 are contained within the local access control data structure of each storage server in the Distributed Data Storage System 114.

As shown in FIG. 3, the access control data (e.g. reservation and registration state) for each one of the storage volumes in Storage Volumes 150 is stored locally in each storage server within a respective one of multiple volume descriptors. The volume descriptors are organized into the Volume Descriptor Array 302. Volume Descriptor Array 302 may include allocated and available volume descriptors. Each storage volume has a unique volume identifier. Index Array 300 maps individual volume identifiers to corresponding ones of the volume descriptors in Volume Descriptor Array 302. Index Array 300 may be indexed directly using volume identifiers themselves, or volume identifiers may first be converted into indices referred to as "host indexes" that are then used to index into the Index Array 300. Each volume identifier may have a corresponding host index. Conversion from a volume identifier to a corresponding host index may be performed using a table or the like. Each entry in Index Array 300 corresponds to a storage volume, and stores an index (or offset) into Volume Descriptor Array 302 that indicates the memory location of the specific volume descriptor corresponding to that storage volume. For example, in order to look up the volume descriptor for a storage volume having Volume Identifier 304, Volume Identifier 304 is used (either directly or indirectly) to index into Index Array 300, thus locating an entry in Index Array 300 that stores the Index 306. Index 306 is then used an index (or offset) into Volume Descriptor Array 302, thus identifying the specific memory location within Volume Descriptor Array 302 at which is stored the volume descriptor for the storage volume that is uniquely identified by Volume Identifier 304, i.e. the memory location of Volume Descriptor 308.

During processing of an access control command indicating certain modifications to access control data of a given target storage volume, rather than simply modifying the contents of the volume descriptor currently mapped to the target storage volume, the disclosed technology instead first allocates a new volume descriptor in Volume Descriptor Array 302, then performs the indicated modifications using the new volume descriptor, and finally performs a single write operation to the entry in Index Array 300 corresponding to the volume identifier of the target storage volume that stores the index of the new volume descriptor into that entry, which is an atomic operation. In this way, the modifications to the access control data are advantageously performed without requiring the access control data to be locked while the modifications are being performed.

Figure 4:
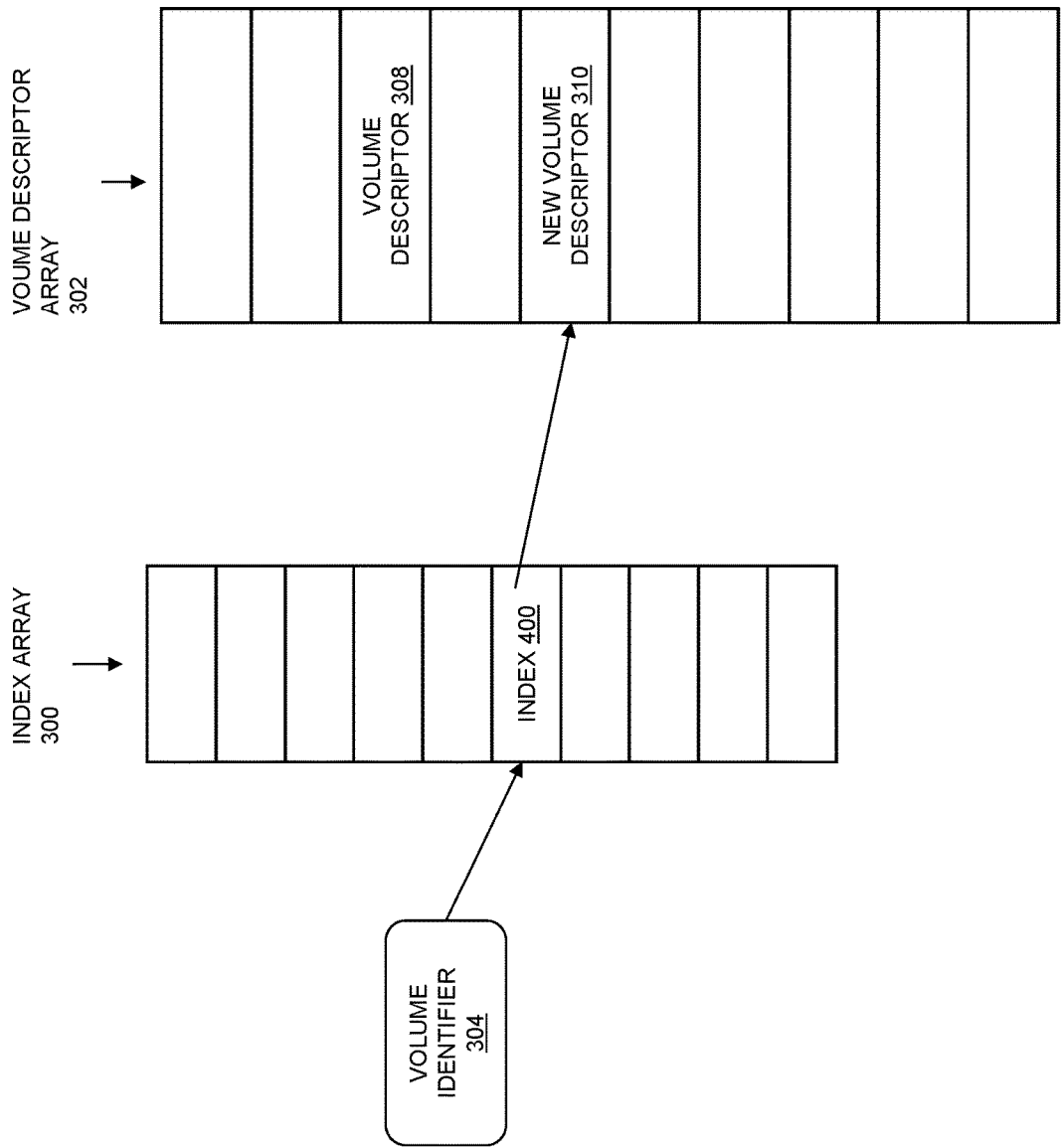
FIG. 4 is a block diagram showing the components of FIG. 3 after a mapping change made during processing of an access control command.

For example, in the case of a preempt registration command directed to the storage volume identified by Volume Identifier 304, rather than modifying the contents of Volume Descriptor 308 directly, the disclosed technology first allocates New Volume Descriptor 310 and then copies the current contents of Volume Descriptor 308 to Volume Descriptor 310. The access control modifications indicated by the preempt registration command are then performed on the contents of New Volume Descriptor 310. As shown in FIG. 4, after the indicated modifications are completed, the disclosed technology performs a single write operation on the entry in Index Array 300 corresponding to Volume Identifier 304, which is an atomic operation, where the write operation stores an Index 400 into that entry. The Index 400 is an index (or offset) into Volume Descriptor Array 302 that identifies the memory location within Volume Descriptor Array 302 at which is stored the new volume descriptor for the storage volume that is uniquely identified by Volume Identifier 304, i.e. the memory location of New Volume Descriptor 310.

Figure 5:
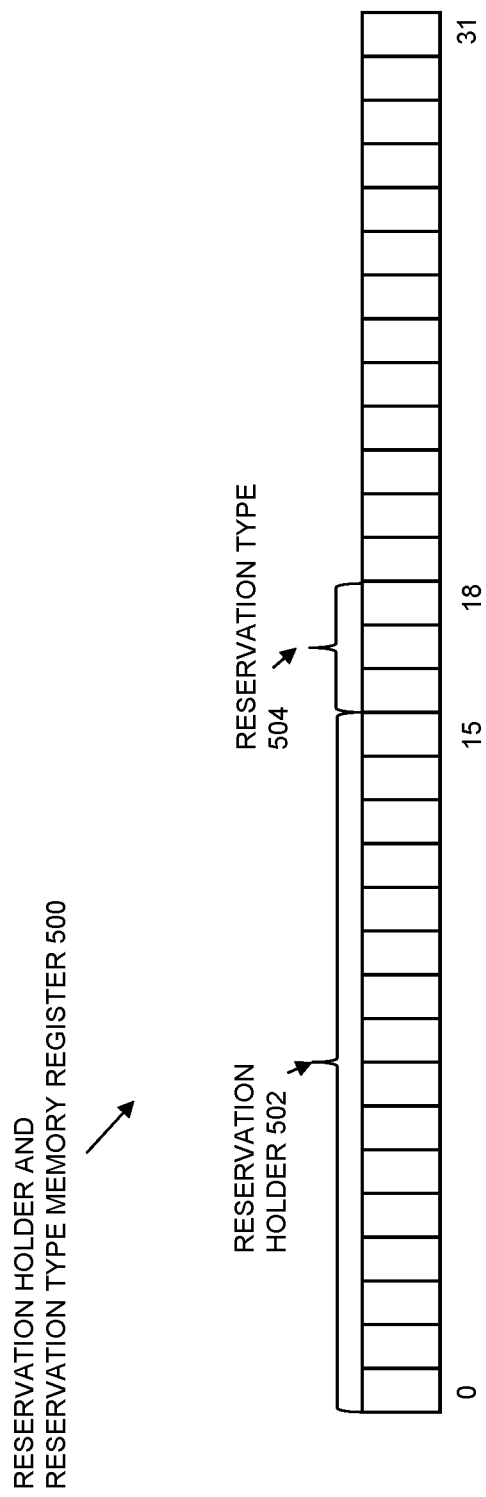
FIG. 5 is a block diagram showing an example of a memory register used to simultaneously store reservation holder and reservation type data in some embodiments of the disclosed technology.

FIG. 5 is a block diagram showing an example of a memory register used to simultaneously store reservation holder and reservation type data for a corresponding storage volume in some embodiments of the disclosed technology. A Reservation Holder and Reservation Type Memory Register 500 as shown in FIG. 5 is contained in each one of the volume descriptors in Volume Descriptor Array 302. The contents of Reservation Holder and Reservation Type Memory Register 500 indicates whether the corresponding storage volume for the volume descriptor is currently reserved, the current reservation holder(s) for that storage volume, and the specific type of any current reservation. Reservation Holder and Reservation Type Memory Register 500 are written using a single write operation, which is atomic, and can also be read using a single read operation, which is also atomic.

In the of example FIG. 5, the Reservation Holder and Reservation Type Memory Register 500 is thirty two bits in length. Those skilled in the art will recognize that other specific sizes and formats of memory register may be used, so long as read and write access can be performed using individual atomic operations.

In the example of FIG. 5, the identity of a host that currently holds the reservation for the corresponding storage volume may be stored in Reservation Holder 502 (e.g. bits 0-15). For example, when the corresponding storage volume is reserved, Reservation Holder 502 may be used to store a host identifier or the like that uniquely identifies a host that currently holds the reservation on the corresponding storage volume. In some embodiments, Reservation Holder 502 may store a host identifier index that is an index into a host identifier data structure, indicating within the data structure the host identifier of the host currently holding the reservation on the corresponding storage volume.

The contents of Reservation Type 504 (e.g. bits 16-18) indicates whether the corresponding storage volume is currently reserved, and, if so, the specific type of the current reservation. For example, if the contents of Reservation Type 504 indicates that the corresponding storage volume is not currently reserved, then any host is permitted to read and write the corresponding storage volume. Otherwise, if the contents of Reservation Type 504 indicates that the corresponding storage volume is currently reserved, then the reservation holder is permitted to read and write the corresponding storage volume, and the contents of Reservation Type 504 further indicates a specific current reservation type. A current reservation type indicated by Reservation Type 504 indicates whether hosts registered with the corresponding storage volume are to be considered reservation holders, whether those hosts registered with the corresponding storage volume are permitted to read and/or write the corresponding storage volume, and whether those hosts that are not registered with the corresponding storage volume are permitted to read the corresponding storage volume. For example, Reservation Type 504 may be used to store an indication of an individual one of the reservation types defined by NVM Express (NVMe), thus indicating the current reservation type for the corresponding storage volume.

Figure 6:
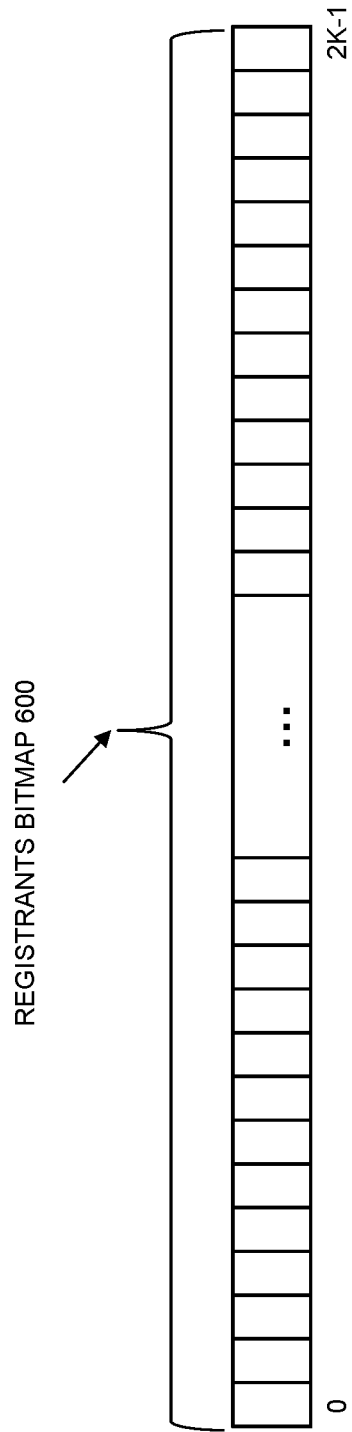
FIG. 6 is a block diagram showing an example of a registrants bitmap indicating which hosts are registered for a storage volume in some embodiments of the disclosed technology.

FIG. 6 is a block diagram showing an example of a Registrants Bitmap 600 indicating which hosts are currently registered with a corresponding storage volume in some embodiments of the disclosed technology. A Registrants Bitmap 600 as shown in FIG. 6 is contained in each one of the volume descriptors in Volume Descriptor Array 302. Each individual bit in Registrants Bitmap 600 corresponds to host, and indicates whether the corresponding host is currently registered with the storage volume corresponding to the volume descriptor containing that Registrants Bitmap 600. For example, each bit in Registrants Bitmap 600 may correspond to a host identifier index, and indicates when set that the host having the host identifier indicated within the host identifier data structure by that host identifier index is currently registered with the storage volume corresponding to the volume descriptor containing Registrants Bitmap 600. While in the example of FIG. 6 the Registrants Bitmap 600 is 2 kilobits in size, other sizes may be used to accommodate different numbers of hosts. Each individual bit in Registrants Bitmap 600 may be read using an atomic read operation, in order to determine whether the corresponding host is registered with a storage volume, or set using an atomic read-modify-write operation, in order to register the corresponding host with the storage volume.

Figure 7:
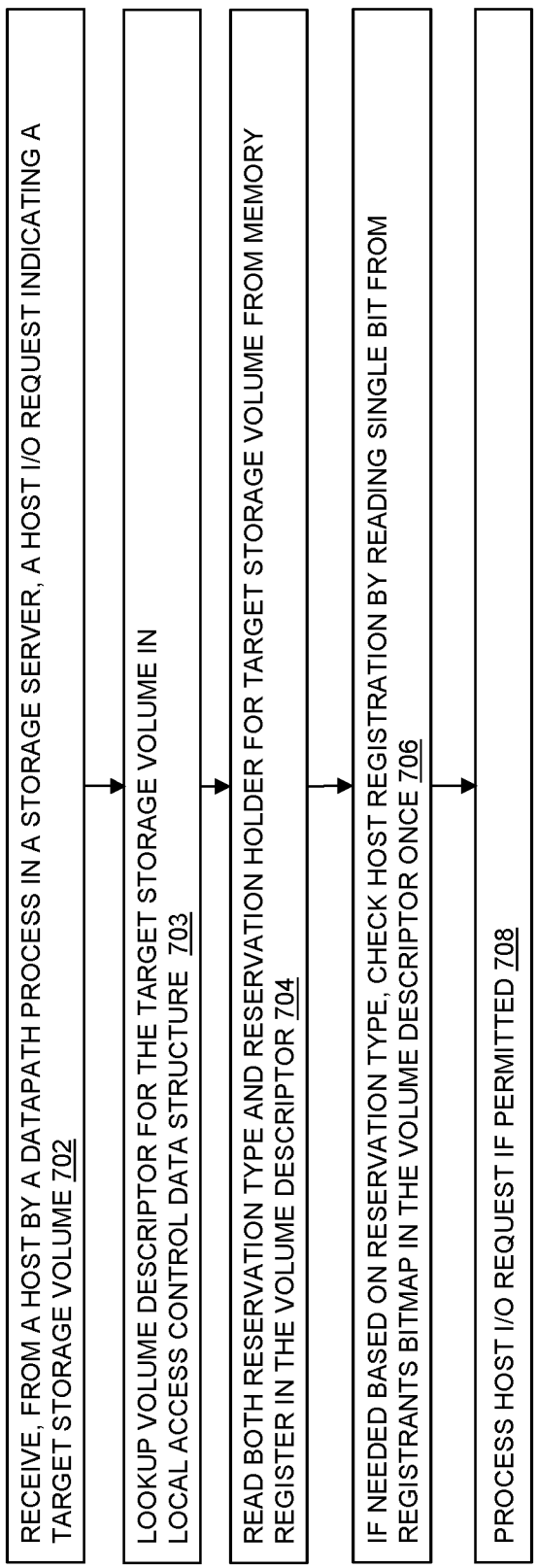
FIG. 7 is a flow chart showing an example of steps performed to provide storage volume access control when processing host I/O requests in some embodiments of the disclosed technology.

FIG. 7 is a flow chart showing an example of steps performed to provide storage volume access control when processing host I/O requests in some embodiments of the disclosed technology. The steps of FIG. 7 are performed for each host I/O request received by Distributed Data Storage System 114. Host I/O requests may be received by any one of the storage servers of the distributed data storage system. For a given host I/O request, the steps of FIG. 7 are performed by the data path process in the storage server that receives the host I/O request, using the data structure in that storage server that stores the local copy of the access control data for Distributed Data Storage System 114. For example, the steps of FIG. 7 are performed by Datapath Process 1 130 for each one of Host I/O Requests 112 that are received by Storage Server 120(1), using Local Access Control Data Structure 138.

At step 702, a host I/O request is received by a data path process, e.g. by Datapath Process 130 for a host I/O request received by Storage Server 120(1). The host I/O request indicates a target storage volume. For example, the host I/O request may contain a volume identifier of the target storage volume for the host I/O request. The target storage volume for a host I/O read request is the storage volume from which host data is to be read and returned to the host that issued the host I/O read request. The target storage volume for a host I/O write request is the storage volume to which host data that is contained in or otherwise indicated by the host I/O write request is to be written.

At step 703, based on the volume identifier of the target volume in the host I/O request, the data path process looks up the volume descriptor for the target storage volume in the local copy of the access control data. For example, Datapath Process 1 130 looks up the volume descriptor for the target storage volume in Local Access Control Data Structure 138, using the volume identifier to index into Index Array 300 to obtain the index indicating the location of the volume descriptor within Volume Descriptor Array 302.

At step 704 the data path process reads both the reservation type and reservation holder data for the target storage volume from the volume descriptor found in step 703, using a single atomic read operation. For example, Datapath Process 1 130 reads the contents of the Reservation Holder and Reservation Type Memory Register 500 in the volume descriptor found in step 703 using a single atomic read operation.

At step 706, if necessary according to the reservation type data obtained at step 704, the data path process (e.g. Datapath Process 1130) checks whether the host that issued the host I/O request is currently registered with the target storage volume, e.g. by performing a single atomic read operation to check the relevant bit in Registrants Bitmap 600.

For example, if the reservation type data obtained at step 704 indicates that the target storage volume is not currently reserved, then there is no need for the data path process to check at step 706 whether the host that issued the host I/O request is currently registered with the storage volume, since any host can read or write the target storage volume, and therefore the host I/O request is determined to be permitted.

In another example, if the reservation type data obtained at step 704 indicates that the target storage volume is currently reserved, and also that the storage volume can be accessed only by reservation holders and registrants, and where the host that issued the host I/O request is not a reservation holder, then step 706 must be performed to determine whether the bit in Registrants Bitmap 600 corresponding to the requesting host indicates that the requesting host is registered with the target storage volume, i.e. to determine whether the corresponding bit is set. In such cases, if the bit is set, then the host is determined to be registered and the I/O request is permitted. Otherwise, if the bit is not set, then the host not registered, and the host I/O request is not permitted.

At step 708, the data path process (e.g. Datapath Process 1 130) completes its determination of whether the host I/O request is permitted to be performed, based on the previously obtained local access control data, as well as on the identity of the specific host issued the host I/O request. If the host I/O request is determined to be permitted, the data path process performs the host I/O request.

FIGS. 8 through 13 illustrate examples of the operation of the disclosed technology in step 210 of FIG. 1, in which the data path process in each storage server updates the volatile local copies of the access control data within each storage server in response receipt of specific types of access control commands by the data storage system. The steps in each one of FIGS. 8 through 13 are performed by each one of the data path processes in the distributed data storage system, resulting in the local volatile copy of the access control data being updated according to the specific access control command for that figure.

Figure 8:
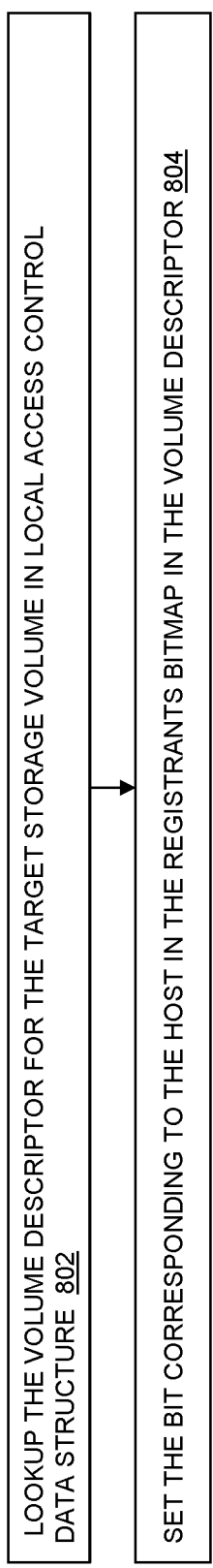
FIG. 8 is a flow chart showing an example of steps performed to process a register command in some embodiments of the disclosed technology.

FIG. 8 is a flow chart showing an example of steps performed to update the local access control data structure in each storage server in response to receipt of a register host access control command by the distributed data storage system.

At step 802, the data path process looks up the volume descriptor for the target storage volume indicated by the register host command in the local access control data structure. The target storage volume for the register host command is the storage volume that the host that issued the register host command is requesting to be registered with, and may be indicated by a storage volume identifier or the like that is contained in the register host command.

At step 804, the data path process sets the bit for the host that issued the register host command in the registrants bitmap in the volume descriptor corresponding to the target storage volume, e.g. using a single atomic read-modify-write operation.

Figure 9:
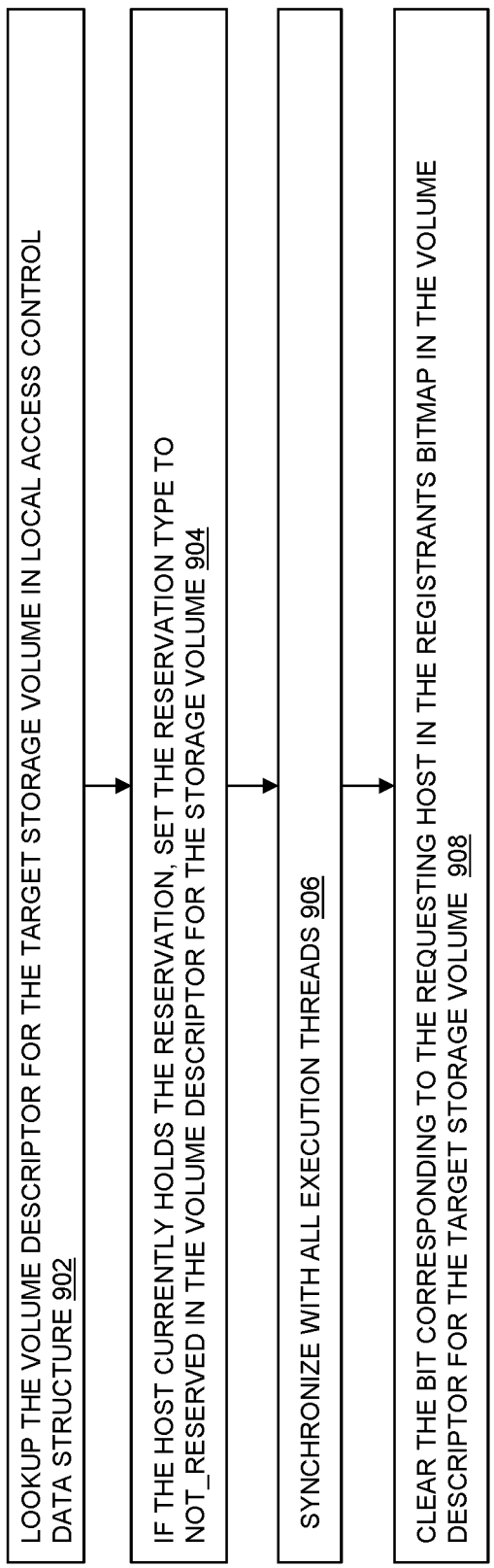
FIG. 9 is a flow chart showing an example of steps performed to process an unregister access control command in some embodiments of the disclosed technology.

FIG. 9 is a flow chart showing an example of steps performed to update the local access control data structure in each storage server in response to receipt of an unregister host access control command by the distributed data storage system.

At step 902, the data path process looks up the volume descriptor for the target storage volume indicated by the unregister host command in the local access control data structure. The target storage volume for the unregister host command is the storage volume that the host that issued the register host command is requesting to be unregistered from, and may be indicated by a storage volume identifier or the like that is contained in the unregister host command.

At step 904, if the host that issued the unregister command currently holds the reservation for the target storage volume, the reservation type in the volume descriptor corresponding to the target storage volume is set to a value indicating that the storage volume is not reserved (e.g. "NOT_RESERVED"), e.g. by performing a single write operation to the Reservation Holder and Reservation Type Memory Register 500 in the volume descriptor.

At step 906, the data path process synchronizes with all other local execution threads. For example, at step 906 the data path process waits until all other execution threads that are processing host I/O requests within the storage server complete and yield their processor core. In this way, the updating of the local access control data is suspended at step 906 until all currently executing host I/O request processing threads have completed, and have been exposed to any change made in step 904.

At step 908, the data path process clears the bit for the host that issued the unregister host command in the registrants bitmap in the volume descriptor corresponding to the target storage volume, e.g. using a single atomic read-modify-write operation.

Figure 10:
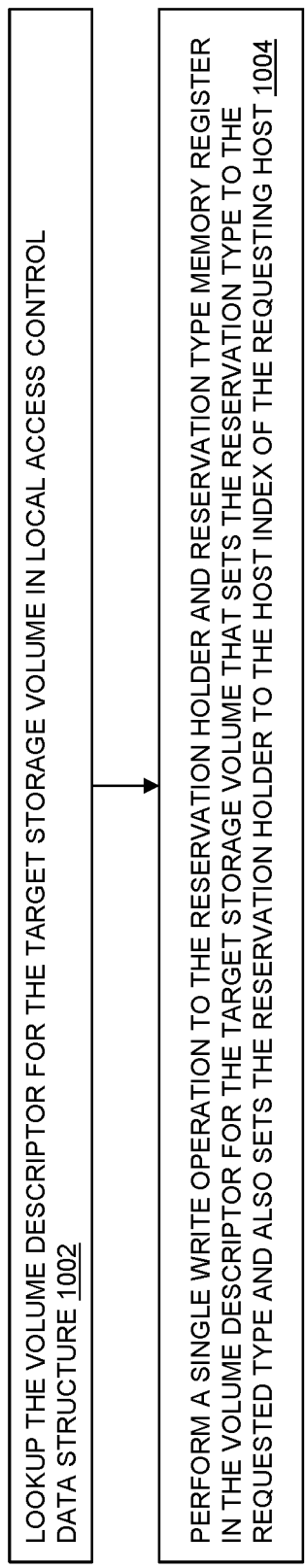
FIG. 10 is a flow chart showing an example of steps performed to process an acquire reservation access control command in some embodiments of the disclosed technology.

FIG. 10 is a flow chart showing an example of steps performed to update the local access control data structure in each storage server in response to receipt of an acquire reservation host access control command by the distributed data storage system At step 1002, the data path process looks up the volume descriptor for the target storage volume indicated by the acquire reservation command in the local access control data structure. The target storage volume for the acquire reservation command is the storage volume that the host that issued the acquire reservation host command is requesting to reserve, and may be indicated by a storage volume identifier or the like that is contained in the acquire reservation command.

At step 1004, the data path process performs a single write operation to the Reservation Holder and Reservation Type Memory Register 500 in the volume descriptor found in step 1002. The write operation is atomic, and simultaneously i) stores the identity of the requesting host (e.g. the host identifier index for that host identifier of that host) into the Reservation Holder 502 of the Reservation Holder and Reservation Type Memory Register 500, and ii) stores the reservation type indicated in the acquire reservation command into the Reservation Type 504 of the Reservation Holder and Reservation Type Memory Register 500. Advantageously, no synchronization step is performed.

Figure 11:
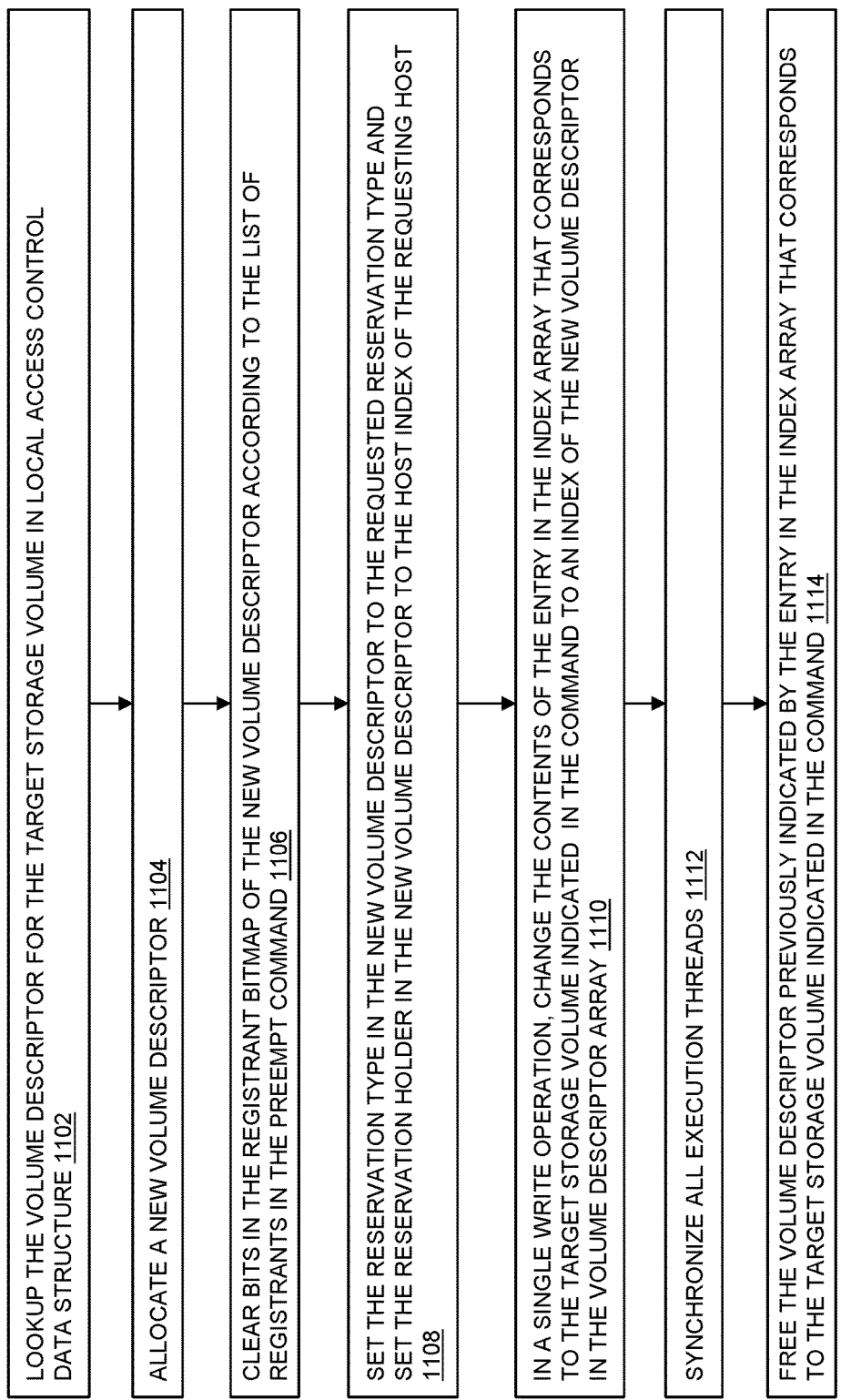
FIG. 11 is a flow chart showing an example of steps performed to process a preempt reservation access control command in some embodiments of the disclosed technology.

FIG. 11 is a flow chart showing an example of steps performed to update the local access control data structure in each storage server of a distributed data storage system in response to receipt of a preempt reservation access control command by the distributed data storage system.

At step 1102, the data path process looks up the volume descriptor for the target storage volume indicated by the preempt reservation command in the local access control data structure. The target storage volume for the preempt reservation command is the storage volume for which the host that issued the preempt reservation host command is requesting to preempt the current reservation, and may be indicated by a storage volume identifier or the like that is contained in the preempt reservation command.

At step 1104, the data path process allocates a new volume descriptor in the Volume Descriptor Array 302, e.g. allocates an available volume descriptor as the new volume descriptor (see FIG. 3). The access control data in the volume descriptor for the target storage volume is copied into the new volume descriptor.

At step 1106, the data path process clears bits in the registrants bitmap (e.g. Registrants Bitmap 600) of the new volume descriptor according to a list of registrants contained in the preempt reservation command. The list of registrants contained in the preempt reservation command indicates those hosts that are to be removed as registrants for the target storage volume by the preempt reservation command.

At step 1108, the data path process sets the reservation type in the new volume descriptor to the requested reservation type indicated in the preempt reservation command, and sets the reservation holder in the new volume descriptor to the host index corresponding to the host that issued the preempt reservation command. For example, the data path process writes the Reservation Holder and Reservation Type Memory Register 500 of the new volume descriptor, causing the Reservation Holder and Reservation Type Memory Register 500 to store the requested reservation type and host index corresponding to the host identifier of the host that issued the preempt reservation command.

At step 1110, using a single atomic write operation, the data path process changes the mapping of access control data to the target storage volume to indicate the new volume descriptor. For example, the data path process performs a single atomic write operation that writes an index of the new volume descriptor (e.g. the index or offset of the new volume descriptor within Volume Descriptor Array 302) to the entry within the index array (e.g. the entry within Index Array 300) that corresponds to the volume identifier of the target storage volume (e.g. the entry that corresponds to the host index for the volume identifier of the target storage volume).

At step 1112, the data path process synchronizes with all other local execution threads. For example, at step 1112 the data path process waits until all other execution threads that are processing host I/O requests within the storage server complete and yield their processor core. In this way, the thread that is updating the local access control data per the preempt reservation command is suspended at step 1112 until all currently executing host I/O request processing threads have completed, and have been exposed to the access control data changes made in the preceding steps.

At step 1114, the data path process frees the volume descriptor previously used to store the access control data for the target storage volume, i.e. the volume descriptor previously indicated by the entry corresponding to the target storage volume within the index array.

Figure 12:
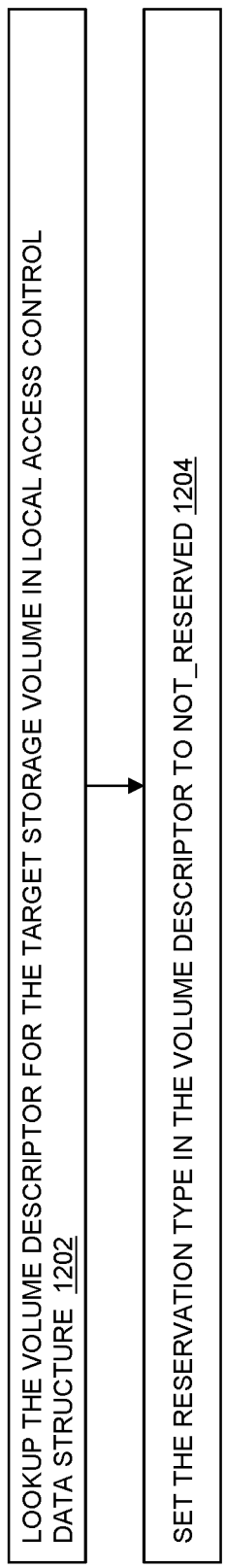
FIG. 12 is a flow chart showing an example of steps performed to process a release reservation access control command in some embodiments of the disclosed technology.

FIG. 12 is a flow chart showing an example of steps performed to clear the reservation type of the target storage volume in the local access control data structure in each storage server of a distributed data storage system in response to receipt of a release reservation access control command by the distributed data storage system.

At step 1202 the data path process looks up the volume descriptor for the target storage volume indicated by the release reservation command in the local access control data structure. The target storage volume for the release reservation command is the storage volume for which the current reservation is to be cleared, and may be indicated by a storage volume identifier or the like that is contained in the release reservation command.

At step 1204, the data path process sets the reservation type in the volume descriptor corresponding to the target storage volume to a value indicating that the storage volume is not reserved (e.g. "NOT_RESERVED"), e.g. by performing a single write operation to the Reservation Holder and Reservation Type Memory Register 500 in the volume descriptor.

Figure 13:
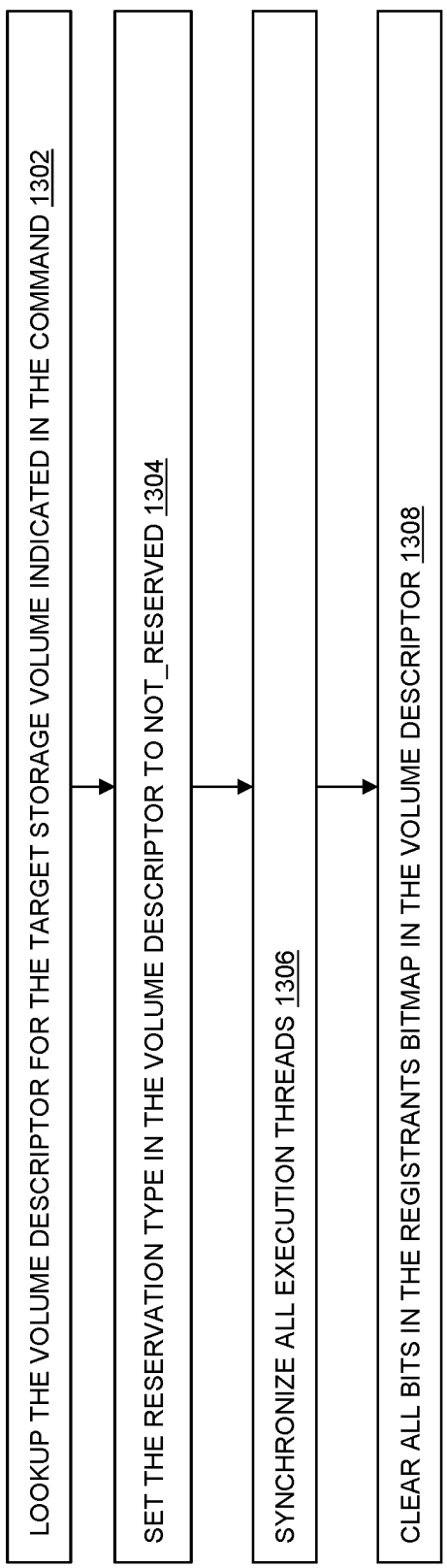
FIG. 13 is a flow chart showing an example of steps performed to process a clear reservation access control command in some embodiments of the disclosed technology.

FIG. 13 is a flow chart showing an example of steps performed to clear the reservation type and registrants of the target storage volume in the local access control data structure in each storage server of a distributed data storage system in response to receipt of a clear reservation access control command by the distributed data storage system.

At step 1302 the data path process looks up the volume descriptor for the target storage volume indicated by the clear reservation command in the local access control data structure. The target storage volume for the clear reservation command is the storage volume for which the current reservation and registrants are to be cleared, and may be indicated by a storage volume identifier or the like that is contained in the clear reservation command.

At step 1304, the data path process sets the reservation type in the volume descriptor corresponding to the target storage volume to a value indicating that the storage volume is not reserved (e.g. "NOT_RESERVED"), e.g. by performing a single write operation to the Reservation Holder and Reservation Type Memory Register 500 in the volume descriptor.

At step 1306, the data path process synchronizes with all other local execution threads. For example, at step 1306 the data path process waits until all other execution threads that are processing host I/O requests within the storage server complete and yield their processor core. In this way, the thread that is updating the local access control data per the clear reservation command is suspended at step 1306 until all currently executing host I/O request processing threads have completed, and have been exposed to the access control data changes made in the preceding steps.

At step 1308, the data path process clears all the current host registrations with the target storage volume, e.g. by clearing all the set bits in the Registrants Bitmap 600 in the volume descriptor corresponding to the target storage volume.

As will be appreciated by those skilled in the art, aspects of the technology disclosed herein may be embodied as a system, method, or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
    storing access control data in each storage server of a distributed data storage system, wherein the access control data in each storage server comprises i) multiple volume descriptors, each one of which stores access control data for a respective one of multiple storage volumes served by the distributed data storage system, and ii) an index array that maps storage volumes to respective volume descriptors; and
    in response to a preempt reservation command being received by the distributed data storage system, performing the following steps in each one of the storage servers to update the access control data stored therein:
        allocating a new volume descriptor,
        setting reservation type, reservation holder, and registered hosts data in the new volume descriptor according to indications in the received preempt reservation command, and
        performing a single write operation on the index array that updates the index array to map a target storage volume indicated in the received preempt reservation command to the new volume descriptor.

2. The method of claim 1, wherein each volume descriptor stores both reservation type and reservation holder data for the respective storage volume within a single memory register.

3. The method of claim 2, wherein performing access control on each host I/O (Input/Output) command received by the distributed data storage system includes:
    translating a volume identifier of a target storage volume indicated by the host I/O command into a location of the volume descriptor for the target storage volume using the index array;
    reading both reservation type and reservation holder data for the target storage volume together from the volume descriptor for the target storage volume only once, using a single read operation; and
    processing the host I/O command if permitted by the reservation type and reservation holder data.

4. The method of claim 3, further comprising, in response to an unregister command being received by the distributed data storage system, performing the following steps in each one of the storage servers to update the access control data stored therein:
    translating a volume identifier of a target storage volume indicated by the unregister command into a location of the volume descriptor for the target storage volume using the index array;
    in response to determining from the volume descriptor for the target storage volume that the host that issued the unregister command currently holds the reservation for the target storage volume, setting the reservation type for the target storage volume to indicate that the target storage volume is not reserved;
    synchronizing execution with all other execution threads in the storage server; and
    clearing a bit corresponding to the host that issued the unregister command in a registrants bitmap within the volume descriptor for the target storage volume.

5. The method of claim 4, further comprising, in response to an acquire reservation command being received by the distributed data storage system, performing the following steps in each one of the storage servers to update the access control data stored therein:
    translating a volume identifier of a target storage volume indicated by the acquire reservation command into a location of the volume descriptor for the target storage volume using the index array; and performing a single write operation to the volume descriptor for the target storage volume that sets the reservation type to a reservation type indicated by the acquire reservation command and the reservation holder information to indicate the host that issued the acquire reservation command.

6. A distributed data storage system including multiple storage servers, each storage server comprising:

processing circuitry and a memory; and wherein the memory has program code stored thereon, wherein the program code, when executed by the processing circuitry, causes the processing circuitry to:

store access control data in the memory, wherein the access control data comprises i) multiple volume descriptors, each one of which stores access control data for a respective one of multiple storage volumes served by the distributed data storage system, and ii) an index array that maps storage volumes to respective volume descriptors; and in response to a preempt reservation command being received by the distributed data storage system, causing the processing circuitry to update the access control data stored in the memory by causing the processing circuitry to:

allocate a new volume descriptor, set reservation type, reservation holder, and registered hosts data in the new volume descriptor according to indications in the received preempt reservation command, and perform a single write operation on the index array that updates the index array to map a target storage volume indicated in the received preempt reservation command to the new volume descriptor.

7. The distributed data storage system of claim 6, wherein each volume descriptor stores both reservation type and reservation holder data for the respective storage volume within a single memory register.

8. The distributed data storage system of claim 7, each storage server further comprising program code which, when executed by the processing circuitry, causes the processing circuitry to perform access control on each host I/O (Input/Output) command received by the distributed data storage system at least in part by causing the processing circuitry to:

translate a volume identifier of a target storage volume indicated by the host I/O command into a location of the volume descriptor for the target storage volume using the index array;

read both reservation type and reservation holder data for the target storage volume together from the volume descriptor for the target storage volume only once, using a single read operation; and process the host I/O command if permitted by the reservation type and reservation holder data.

9. The distributed data storage system of claim 8, each storage server further comprising program code which, when executed by the processing circuitry in response to an unregister command being received by the distributed data storage system, updates the access control data stored in the memory of the storage server by causing the processing circuitry to:

translate a volume identifier of a target storage volume indicated by the unregister command into a location of the volume descriptor for the target storage volume using the index array;

in response to a determination based on the volume descriptor for the target storage volume that the host that issued the unregister command currently holds the reservation for the target storage volume, setting the reservation type for the target storage volume to indicate that the target storage volume is not reserved;

synchronize execution with all other execution threads in the storage server; and clear a bit corresponding to the host that issued the unregister command in a registrants bitmap within the volume descriptor for the target storage volume.

10. The distributed data storage system of claim 9, each storage server further comprising program code which, when executed by the processing circuitry in response to an acquire registration command being received by the distributed data storage system, updates the access control data stored in the memory of the storage server by causing the processing circuitry to:

translate a volume identifier of a target storage volume indicated by the acquire reservation command into a location of the volume descriptor for the target storage volume using the index array; and perform a single write operation to the volume descriptor for the target storage volume that sets the reservation type to a reservation type indicated by the acquire reservation command and the reservation holder information to indicate the host that issued the acquire reservation command.

11. A computer program product including a non-transitory computer readable medium having instructions stored thereon, wherein the instructions, when executed on processing circuitry, cause the processing circuitry to perform steps including:

storing access control data in each storage server of a distributed data storage system, wherein the access control data in each storage server comprises i) multiple volume descriptors, each one of which stores access control data for a respective one of multiple storage volumes served by the distributed data storage system, and ii) an index array that maps storage volumes to respective volume descriptors; and in response to a preempt reservation command being received by the distributed data storage system, performing the following steps in each one of the storage servers to update the access control data stored therein:

allocating a new volume descriptor, setting reservation type, reservation holder, and registered hosts data in the new volume descriptor according to indications in the received preempt reservation command, and performing a single write operation on the index array that updates the index array to map a target storage volume indicated in the received preempt reservation command to the new volume descriptor.

12. The computer program product of claim 11, wherein each volume descriptor stores both reservation type and reservation holder data for the respective storage volume within a single memory register.

13. The computer program product of claim 12, wherein the instructions, when executed on processing circuitry of each one of the storage servers, further cause the processing circuitry to perform access control on each host I/O (Input/Output) command received by the storage server by performing steps including:

translating a volume identifier of a target storage volume indicated by the host I/O command into a location of the volume descriptor for the target storage volume using the index array;

reading both reservation type and reservation holder data for the target storage volume together from the volume descriptor for the target storage volume only once, using a single read operation; and processing the host I/O command if permitted by the reservation type and reservation holder data.

14. The computer program product of claim 13, wherein the instructions, when executed on processing circuitry in response to an unregister command being received by the distributed data storage system, further cause the processing circuitry to update the access control data in each one of the storage servers by performing steps in each storage server including:

translating a volume identifier of a target storage volume indicated by the unregister command into a location of the volume descriptor for the target storage volume using the index array;

in response to determining from the volume descriptor for the target storage volume that the host that issued the unregister command currently holds the reservation for the target storage volume, setting the reservation type for the target storage volume to indicate that the target storage volume is not reserved;

synchronizing execution with all other execution threads in the storage server; and clearing a bit corresponding to the host that issued the unregister command in a registrants bitmap within the volume descriptor for the target storage volume.

15. The computer program product of claim 14, wherein the instructions, when executed on processing circuitry in response to an acquire reservation command being received by the distributed data storage system, further cause the processing circuitry to update the access control data stored in each one of the storage servers by performing steps in each one of the storage servers including:

translating a volume identifier of a target storage volume indicated by the acquire reservation command into a location of the volume descriptor for the target storage volume using the index array; and performing a single write operation to the volume descriptor for the target storage volume that sets the reservation type to a reservation type indicated by the acquire reservation command and the reservation holder information to indicate the host that issued the acquire reservation command.

* * * * *